(12) United States Patent
Hack

(10) Patent No.: US 8,166,461 B2
(45) Date of Patent: *Apr. 24, 2012

(54) ADAPTIVE PROFILING BY PROGRESSIVE REFINEMENT

(75) Inventor: Michel Henri Theodore Hack, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 995 days.

This patent is subject to a terminal disclaimer.

(21) Appl. No.: 12/132,008

(22) Filed: Jun. 3, 2008

(65) Prior Publication Data

US 2008/0229057 A1  Sep. 18, 2008

Related U.S. Application Data

(63) Continuation of application No. 11/315,856, filed on Dec. 22, 2005, now Pat. No. 7,761,854.

(51) Int. Cl.
*G06F 9/44* (2006.01)
(52) U.S. Cl. ......... 717/128; 717/131
(58) Field of Classification Search .......... None
See application file for complete search history.

(56) References Cited

U.S. PATENT DOCUMENTS

| | | | | |
|---|---|---|---|---|
| 5,583,657 A * | 12/1996 | Jeong | ........ | 382/248 |
| 5,774,724 A * | 6/1998 | Heisch | ........ | 717/129 |
| 5,787,285 A * | 7/1998 | Lanning | ........ | 717/130 |
| 5,793,947 A * | 8/1998 | Sakamoto | ........ | 714/45 |
| 5,884,080 A * | 3/1999 | Blandy et al. | ........ | 717/130 |
| 5,896,538 A * | 4/1999 | Blandy et al. | ........ | 717/127 |
| 6,658,416 B1 * | 12/2003 | Hussain et al. | ........ | 1/1 |
| 6,668,372 B1 * | 12/2003 | Wu | ........ | 717/130 |
| 6,934,935 B1 * | 8/2005 | Bennett et al. | ........ | 717/127 |
| 7,421,681 B2 * | 9/2008 | DeWitt et al. | ........ | 717/128 |
| 2001/0042172 A1 * | 11/2001 | Duesterwald et al. | ........ | 711/125 |
| 2004/0163077 A1 * | 8/2004 | Dimpsey et al. | ........ | 717/130 |
| 2005/0071822 A1 * | 3/2005 | DeWitt et al. | ........ | 717/131 |
| 2008/0189687 A1 * | 8/2008 | Levine et al. | ........ | 717/128 |

* cited by examiner

*Primary Examiner* — Tuan Dam
*Assistant Examiner* — Samuel Hayim
(74) *Attorney, Agent, or Firm* — Tutunjian & Bitetto, P.C.; Preston J. Young, Esq.

(57) ABSTRACT

A system/method for profiling a sequence of values from a range to determine a frequency of occurrence of a subrange includes, for a current block, determining whether cells of the current block include a count cell or a pointer cell. If the cell includes a pointer cell, follow an address that the pointer makes reference to and designate a new block as the current block and repeat the determining step for the new block. If the cell includes a count cell, increment the count cell and compare the incremented count cell to a threshold. If the count exceeds the threshold, convert the count cell to a pointer cell, which points to a newly allocated block. The newly allocated block is made the current block, and the steps are repeated until count cells do not exceed the threshold or a limit resolution is achieved.

25 Claims, 5 Drawing Sheets

ADAPTIVE PROFILING BY PROGRESSIVE REFINEMENT

RELATED APPLICATION INFORMATION

This application is a Continuation of U.S. patent application Ser. No. 11/315,856 now U.S. Pat. No. 7,761,854 filed Dec. 22, 2005 and issued Jul. 20, 2010, incorporate herein by reference in its entirety.

BACKGROUND

1. Technical Field

The present invention relates to profiling and more particularly to a system and method which employs progressive refinement to determine a number of occurrences of small ranges of addresses or numbers within a much larger range to determine patterns and detect distribution.

2. Description of the Related Art

Profiling includes detecting patterns and measuring distributions. Profiling (e.g., timer-driven address sampling) when a range of addresses, numbers, etc. is large, the desired resolution is high, or the ranges of possible hot spots are not known in advance, is a difficult task. A standard linear histogram approach would require an unreasonable amount of space.

A binary search tree organization (e.g., splay or splice) may be a possibility when hits occur in a bounded number of bins (whose addresses may be unpredictable), but breaks down (e.g., with excessive storage consumption) when there are many scattered addresses with single (or a small number) of hits. A hash-based organization has similar properties.

SUMMARY

A system/method for profiling a sequence of values from a range to determine a frequency of occurrence of a subrange includes, for a current block, determining whether cells of the current block include a count cell or a pointer cell. If the cell includes a pointer cell, follow an address that the pointer makes reference to and designate a new block as the current block and repeat the determining step for the new block. If the cell includes a count cell, increment the count cell and compare the incremented count cell to a threshold. If the count exceeds the threshold, convert the count cell to a pointer cell, which points to a newly allocated block. The newly allocated block is made the current block, and the steps are repeated until count cells do not exceed the threshold or a limit resolution is achieved.

The profiling system/method is employed to tabulate a frequency of occurrence of numerical values in certain ranges ("counting bins" or address intervals), when the range of possible values is much larger than a finest resolution (smallest bin size) that is to be achieved. Advantageously, the method performs this tabulation of frequencies (counts) within a bounded and relatively small amount of total space for the bin counters.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
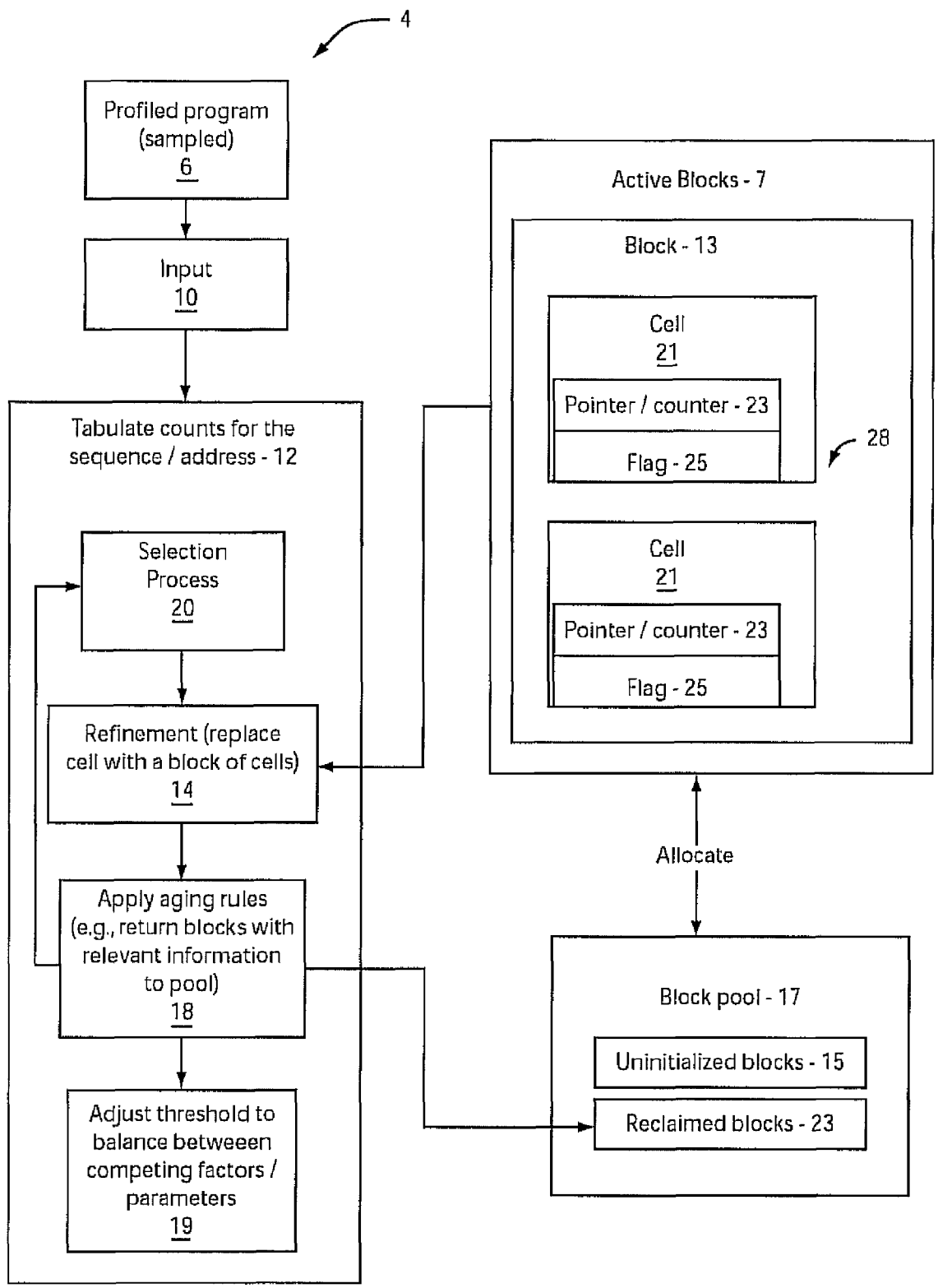
FIG. 1 is a block/flow diagram showing an illustrative system/method for progressive refinement for profiling or determining a frequency of occurrence of a sequence in accordance with an illustrative embodiment of the present invention.

Embodiments of the present invention start profiling at a very coarse granularity (e.g., a range, for example, 16 bins covering the entire address space), and refine the granularity (e.g., to a sub-range using smaller bins) when a coarse bin count exceeds a threshold. This refinement may be applied recursively until the finest desired resolution has been reached. The resulting structure may resemble a Radix tree.

In accordance with an illustrative method of progressive refinement, counters are arranged in blocks of, e.g., 16. Initially, one block covers the entire address space, e.g., a 4G address space. A millisecond timer may sample a current execution address (addr) and use a relevant subset of 4 bits of the address to index into the block of counters. Each counter field could in fact hold either a count or a pointer to a descendant refinement block (using one tag bit).

If the counter is below a threshold, the counter is incremented; otherwise a new block is allocated, and the counter field is converted to a descendant pointer (unless the desired final granularity was reached, in which case the threshold is ignored and the counter is always incremented). If the field holds a descendant pointer, the refinement block would be indexed into using the next-lower 4 bits of the sampled address, recursively until the deepest level was reached (at which point the threshold would be ignored, as mentioned above).

With a 32-bit address, 4 bits per level, and a finest resolution of 16 bytes, the depth of the refinement tree may reach, e.g., at most 7 layers. The net result includes that all hot spots (having received a number of hits (e.g., at least 7 times the threshold hits)) would be covered at sufficient granularity to identify the current function, yet the total amount of space occupied by the counters reflected only the actual size of the active regions of the code, regardless of their positioning. Infrequently-visited regions are profiled with coarser granularity, possibly adding some useful extra information.

If the total amount of storage allocated for the counter blocks is fixed, and new regions of hot spots continued coming up, the refinement threshold may be raised. For example, possibly to the maximum (in which case no further refinement or table consumption would occur). In a worst case, this could mean that detailed information for late phases may not be sufficiently refined. This should be an unlikely occurrence in the case of one-shot profiling.

Embodiments of the present invention may find utility in a plurality of different applications and fields. One such application includes profiling which may include static or dynamic profiling. Profiling may be employed to determine where a program spends its time. This may be performed by instance counting where the profiling code is built-in to a program to gather information on the number of occurrences of an event or sequence. In another application, sampling is performed which tabulates sampled instruction addresses.

Compiled programs may have static bin assignments based on program layout (e.g. by function or by line-number), or fixed-size bins. For high resolution, many bins are needed. Advantageously the present invention reduces the number of bins needed to tabulate counts in a profiling program.

Dynamic profiling determines frequencies of all events or sequences even if the distribution is not known initially. For example, new bins can be created when a new address sequence has been encountered. Program addresses may not be known in advance, e.g. Just-In-Time (JIT) compilation, or FORTH programming language with dynamic compilation. The potential address range can be large and equi-distributed fixed-size bins need tradeoffs between space and resolution. In addition, hash or list profiling needs allocation of new bins as new addresses are encountered, or increment counts in old bins. Resolution in these methods is needed (selected) in advance.

For adaptive profiling as in the present invention, the process starts out with coarse resolution, identifies regions of interest, and uses higher resolution in those regions. Advantageously, resolution can be refined as needed.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the present invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The following terms are described for ease of explanation of aspects of the present invention.

Input: means to receive a sequence of numbers, hereafter called "addresses". The range of possible values may be large, but is fixed and known in advance. The concept of "interval", e.g., all addresses from A to B, is meaningful, at least locally (e.g. when the difference between A and B is not too large). Let AS be the address size in bits, so $2^{AS}$ is the smallest power of two that exceeds the largest possible address.

Cell: an entity that implicitly describes an interval, and holds (implicitly or explicitly) a count of addresses, e.g., a bin, falling into that interval, and received at the input.

Block: an array of cells describing adjacent intervals of equal size; logically also a cell describing the union of those intervals. The number of cells in a block is a fixed power of two, e.g., four or sixteen.

Refinement: the act of logically replacing a cell by a block of cells, so as to increase the resolution (decrease the interval size) at which counts are accumulated. The number of cells per block is called the refinement factor; its base-two logarithm is the refinement shift, denoted hereafter by RS.

Threshold: the count value which, when exceeded, triggers refinement of the cell whose count exceeds the threshold. The threshold may be static or may change with time; it may be global, or cell-specific.

Limit resolution: the smallest interval subject to refinement. If a cell has reached the limit resolution (through a sequence of refinements), its threshold is effectively unbeatable, so that no further refinement will occur.

Block pool: an array or list of blocks available for allocation as needed by refinement operations.

Aging: an optional mechanism for distinguishing blocks with more relevant information from blocks with less, so the latter can be reclaimed and returned to the block pool for re-allocation.

Anchor block: the top-level block that describes the entire address space and, as a "root" cell, holds the total count of inputs received. In the initial state, this is the only block, with a count of zero.

Selection: the process of finding the highest-resolution (smallest covered interval) cell that covers the address received at the input.

Remaining Shifted Address (RSA) during "selection," high-order bits of the address are extracted, and the remaining bits are shifted left to expose a new set of available high-order bits, to obtain the next RSA. When an address is received at the input, the RSA is initialized to the received address.

Current block (CB): during the "selection" process, the block that has been reached by indexing from a parent block using the index bits extracted from the previous RSA or the Anchor block at the beginning of the selection process.

Referring now to the drawings in which like numerals represent the same or similar elements and initially to FIG. 1, in one illustrative embodiment, a system or program 4 is provided for profiling in accordance with progressive refinement. In the example given, an adaptive profiling of a program or programs 6 is performed, e.g., by a sampling procedure to generate counts. It is to be understood that the present invention will be described in terms of program profiling, but should not be limited thereby since many other applications may benefit from the present invention.

The adaptive profiling may be employed to audit a program or simply determine where the program spends its time. The profiling may be performed statically and/or dynamically and reduces the amount of memory needed to perform such profiling tasks.

An input 10 is the device that captures a given address(s), e.g., from a sampling procedure executed on program 6. Input 10 inputs the addresses to a tabulation process 12 to determine a frequency of occurrence of the sequence or address. The occurrence of an address in a sequence or part of a sequence is determined in a given block space by a number of counts. A selection process 20 is employed to select a next block to determine a number of counts within cells 21 within a set interval, to increment the corresponding count, and possibly to trigger other actions, such as, e.g., a continued refinement in box 14 to increase resolution or apply optional aging rules in box 18. The selection process traverses a single path through the tree starting from the anchor block, and looks at only one cell per block using an indexing method. At each level only one cell is examined, or one pointer is followed to reach the next level.

In one embodiment, cells 21 include a counter/pointer field 23, which respectively stores a count or an address and a flag 25 to distinguish between the two uses of the cell 21 (between counter or pointer). A decoding method may also be employed to decipher between pointer cells and count cells (see, e.g., FIG. 3).

A block is a structure 13 including zero or more header or block count fields (not shown) and a fixed-size ($2^{RS}$) array 28 of cells 21. The block count field is optional, but may be useful in providing a more accurate count, as it provides an additional memory location to store accumulated counts.

For refinement in box 14, a new block is allocated from a block pool 17 to become an active block (current block) 7. The block pool includes uninitialized blocks 15 which are available for allocation if needed for refinement, and reclaimed blocks 23 which are also made available for refinement if an aging process is employed. The cell being refined in the active block 7 is examined to determine if the cell includes a count or pointer. If a count cell, the count is incremented and compared to a threshold. If the threshold is exceeded, the count cell is switched from its "counter" state to a "pointer" state, the pointer pointing to a new block allocated from the block pool 17. The new block increases the resolution by some factor to permit a more accurate frequency count without needing a large amount of memory storage space. This will be described in greater detail with respect to FIG. 2.

In box 18 aging rules may be applied to reclaim a block or blocks or memory and add then to the pool 17. Aging is described in greater detail below. In box 19, the threshold for determining refinement (based on counts) may be adjusted. The adjustment of the threshold balances features or parameters against one another. For example, adjusting the threshold may include balancing between importance of occurrences and available space or balancing between importance of occurrences and resolution, between resolution and available space, etc.

Figure 2:
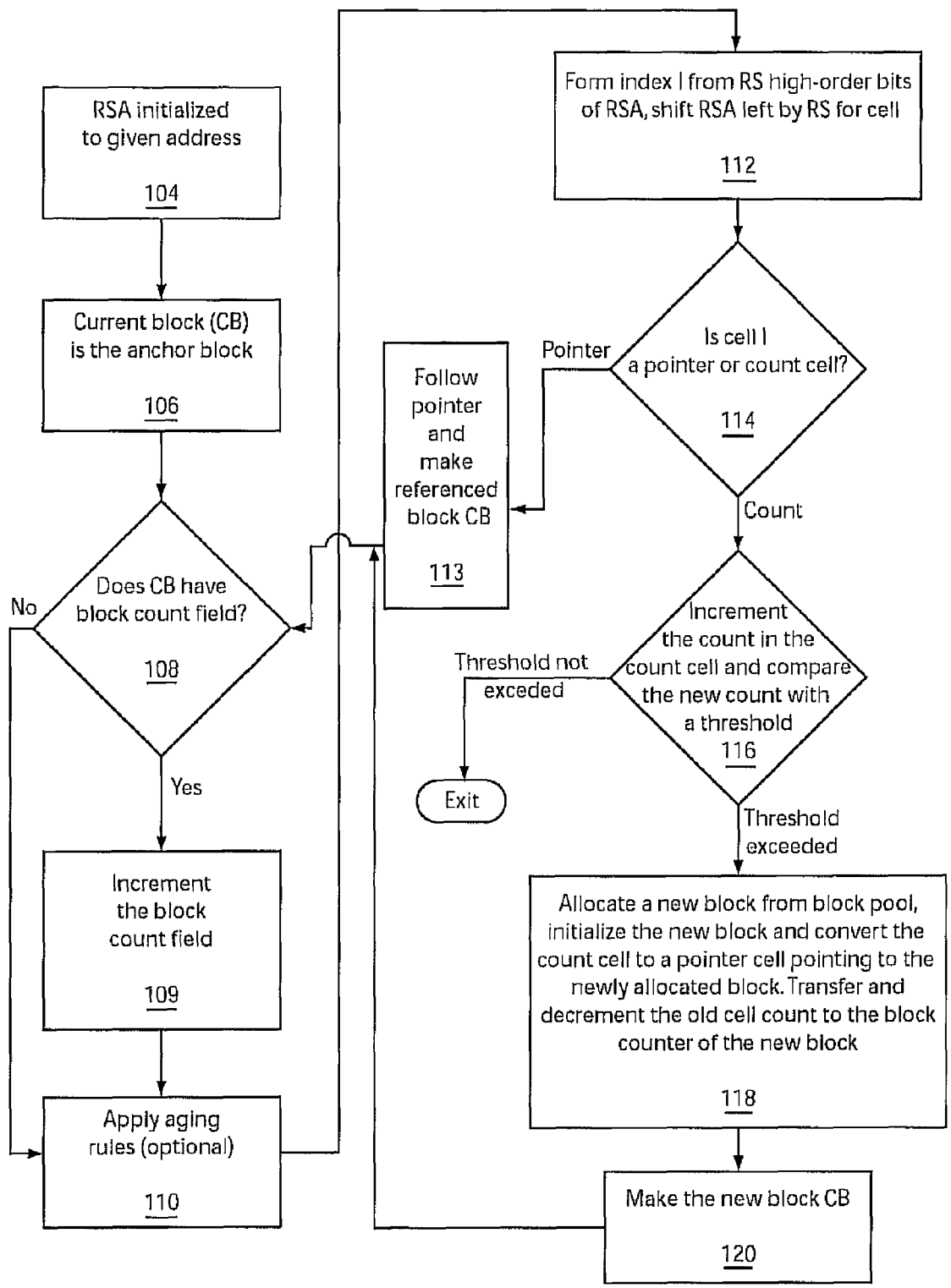
FIG. 2 is a block/flow diagram showing further detail on an illustrative system/method for a selection process for the progressive refinement in accordance with FIG. 1.

While FIG. 1 illustratively shows high level depictions of one illustrative embodiment, FIG. 2 provides greater detail for a particularly useful embodiment.

Referring to FIG. 2, the process of FIG. 1 may proceed as follows. After receiving an address from input, in box 104, the Remaining Shifted Address (RSA) is initialized to the given address. In box 106, the Current Block (CB) is the Anchor block. In box 108, if the CB has a block count field (as the Anchor Block does for the total count), increment the block count field. Aging rules, if any, may be applied to the CB at this point in box 110.

In box 112, an index I is formed from the refinement shift (RS) high-order bits of the RSA, and the RSA is shifted left by RS, effectively discarding those extracted high-order bits. Other methods may be employed for refining the resolution. For example, a sequence (e.g., address) may be broken down into subsequences or portions of the sequence (address) may be truncated using other methods. In box 114, the cell indexed by I is examined. If the cell is a pointer cell, follow the pointer and make the referenced block the CB, then loop back to box 108. If the cell is a count cell, proceed to box 116. This will happen at the latest by the time the limit resolution has been reached.

In box 116, increment the count in the count cell and compare the new count to an applicable threshold. If the threshold *is not* exceeded, Exit. If the threshold *is* exceeded, proceed to box 118. Note that if the limit resolution has been reached (this can be determined by keeping track of the depth of the tree descent), the effective threshold is unbeatable, and no further refinement is possible.

The selection process is completed at this point, and the selected count has been incremented. If indicated by the threshold comparison in box 116, refinement is applied starting at box 118.

In box 118, allocate a new block from the block pool 17 (FIG. 1) initialize the new block, and convert the count cell (indexed in block 114) to a pointer cell pointing to the newly-allocated block. The old cell count (remembered before converting the count cell to a pointer cell) can be transferred to the block counter of the new block (if there is one—this makes the count conservative), and decremented to compensate for re-increment at box 108.

Initialization involves setting all cells included in the new block to the counter state, with an initial count of zero. Initialization may set a backpointer from the new block to the cell that was just refined—this may be needed in some implementations but not others. Depending on allocation policy, the threshold may be raised locally or globally. In one scheme, the threshold is set globally to an unbeatable value when the last available block is allocated, so as to prevent any further refinement.

Then, make the new block the CB in box 120 and return to box 108, which will lead to 112 incrementing a new counter cell to record the event at the refined resolution. The process eventually exits at box 116. The program traverses a single path through the tree starting from the anchor block, and looks at only one cell per block using an indexing method. At each level only one cell is examined, or one pointer is followed to reach the next level. Advantageously, one reason the method is fast is that there are no comparisons to be made to perform the selection—direct indexing to the right place is employed. This direct indexing using bit selections makes the methods of the present invention especially effective.

Figure 3:
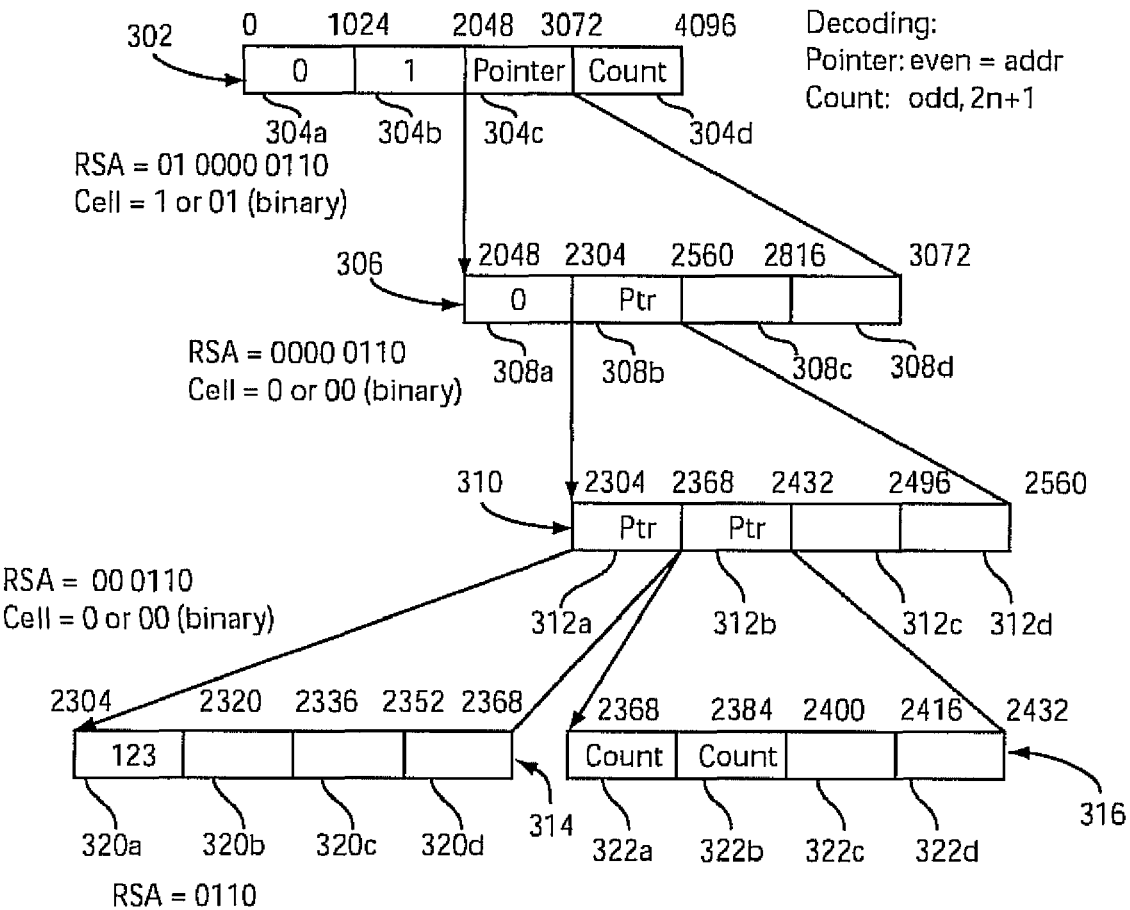
FIG. 3 is a diagram showing an illustrative example determining counts for a progressive refinement method in accordance with the present invention.

Referring to FIG. 3, a diagram showing an illustrative example is depicted. In one example, a frequency for a sequence or numbers or an address appearing in a memory storage array is to be determined. Blocks may include a block count field (not shown), which designates a total number of counts for that block (see e.g., FIG. 5). This is optional. Blocks include pointer cells and count cells (designated by "count" e.g., in cell 304*d* or by a number in the cell, e.g., "1" in cell 304*b*).

A decoding scheme may be employed to flag a cell as a pointer cell or a count cell. For example, a pointer cell may include an even number as an address, and the count cell may include an odd number, 2n+1, where the actual count is n.

In the example, address "hits" in the artificially small range of 0 to 4095 are to be tabulated, with a resolution of 16 units, and a refinement factor of four. (The small range is for illustrative purposes only.)

Figure 4:
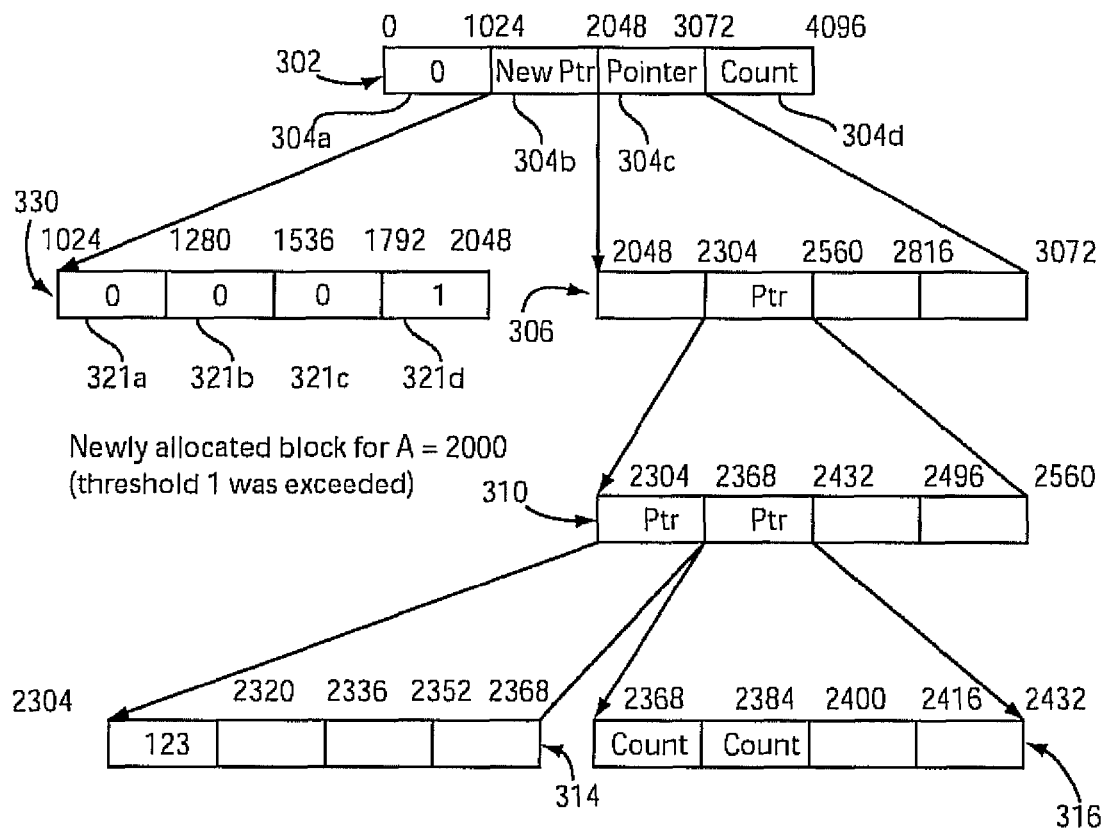
FIG. 4 is a diagram showing an illustrative example applying the progressive refinement method in accordance with the present invention.

FIG. 3 describes the state of active blocks (302, 306, 310, 314 and 316) at one point in time, after a sequence or an address such as 2305 2315 2370 2000 (and 125 more 4-digit sequences in the range 2304-2319, and lots more in the range of 2368-2399, but no more in the range 0-2303 in this example). FIG. 4 has the same elements as FIG. 3, but shows the change due to a refinement action in response to a new value, 2000.

Block 302 is the anchor block describing a range of addresses from 0 to 4095 with an initial resolution of 1024 (in each of four cells). Block 302 includes cells 304a-304d. Cell 304c is a Pointer cell, and points to block 306. This indicates that the range 2048-3071 has received more address hits than the threshold. The threshold is assumed to be 1 here. The other three cells (304a, b, and d) include counts at or below the threshold, indicating that at most one address hit has occurred in each of the corresponding subranges.

Block 306 also includes pointer cells (Pointer or Ptr) and count cells (designated by "count" e.g., as in cell 304d or by a number in the cell, e.g., "1" as in cell 304b). In fact, four levels of refinement are shown, and the resolution limit of 16 has been reached at the fourth level.

Still referring to FIG. 3, an illustrative example of a selection process for determining counts for an address "2310" is shown. "2310" falls into the quadrant 2048-3071, so cell 304c is selected by an index derived from the first two bits of the address (2310 is "1001 0000 0110" in binary, leading to an index of binary "10", or 2). Cell 304c includes a pointer ("Pointer") to a descendant block 306, and the Remaining Shifted Address (RSA) becomes "01 0000 0110" in binary (the Refinement Shift RS is 2 in this illustration; $2^2$=4 cells per block). Block 306 is indexed into by the next two bits of the RSA, which are "01" binary, picking out cell 308b. This in turn is a pointer cell ("Ptr") which points to block 310. Selection continues with an RSA of "0000 0110", of which the first two bits "00" pick out cell 312a of block 310, and the RSA becomes "00 0110". Finally, block 314 is reached, and cell 320a in block 314 is selected by bits "00" of the RSA, making the last and final RSA "0110". Having only four bits, the finest resolution of $2^4$=16 has been reached, and selection stops: count "123" in cell 320a would be incremented to "124".

In this example, the selection path ends up incrementing the count in cell 320a of block 314, which corresponds to a final count at the highest resolution available for the address 2310. Block 316 is at a same level as block 314 and includes cells 322a-d.

Referring to FIG. 4, an illustrative example of a refinement step is illustratively shown. Assume now that a new input, A=2000, is received. Cell 304b is selected (1024<=2000<=2047), and its count incremented to 2, which exceeds the threshold. A new block 330 is allocated from the block pool, and cell 304b is converted to a pointer cell (New Ptr) pointing to the new block 330. The new block is initialized to four count cells 321a, 321b, 321c and 321d, each set to zero. The selection process is then resumed, and the pointer (New Ptr) is followed, cell 321d is selected (since 1792<=2000<=2047), and the count incremented to 1.

As described above, embodiments of the present invention may be employed to tabulate the frequency of occurrence of numerical values (e.g., addresses) in certain ranges ("counting bins"), when the range of possible values is much larger than the finest resolution (smallest bin size) that is to be achieved, and do so within a bounded and relatively small amount of total space for the bin counters. The applications of the present invention are not limited to computer code or programs and may be employed in other applications, such as, for example, DNA/RNA sequencing applications. Information obtained about infrequent events may be collected at a lower resolution (larger bin size) than that for very frequent events, thus reducing the amount of storage needed for the bin counters. This permits high-resolution (small bin size) information to be collected about the most frequent events in an efficient manner. In addition, resolution versus space tradeoffs may be executed dynamically based on various criteria, e.g., by adjusting the threshold, that can be adjusted from time to time without losing information already collected.

In a simple embodiment, a single run of events to be profiled as described above may be permitted within a fixed amount of counter storage, such that early high-frequency events are guaranteed to be profiled at the highest planned resolution, and at least summary information (at a coarser resolution) will be available about unexpected late high-frequency events of a character that does not match the earlier distribution. (This property would permit the parameters to be changed so as to capture the missing detailed information on a subsequent run.)

When combined with a suitable aging mechanism, embodiments permit a continuous run of events to be profiled as described above, within a fixed amount of counter storage, such that all high-frequency events that occurred in the recent past have been profiled at the highest planned resolution. Timespan versus space tradeoffs may be determined to be executed dynamically, where timespan refers to the historical coverage of high-frequency events profiled at the highest resolution.

Other methods exist to capture frequency information, but none of those capture the combination of small counter space, high resolution, and wide storage in a dynamically-adjustable manner. When counter space is bounded a-priori, static bin counting forces a direct tradeoff between resolution and coverage, and when coverage needs to be wide, high-resolution cannot be achieved at all. Hash-based approaches with aging permit the latest high-frequency events to be collected, but the resolution has to be fixed ahead of time, and cannot be traded off against frequency, nor can it be adjusted dynamically.

Other applications of the present invention may include profiling DNA strings, where substrings of a given length are the items to be tabulated. Among millions of strings of varying length (really, pieces of a very long DNA string that was chopped up by current methods of gene sequencing), tabulations of all 100-codon substrings may be performed to identify those that occur significantly more often than others, and useful information may be extracted.

Another application may include disk block numbers, as sent out in requests to a storage server. Contiguous ranges of blocks of various extents may show widely different usage characteristics, and adaptive profiling can extract this information, to be used for better resource management.

Another application may be employed for pairs of Internet addresses seen by network routers. A determination of which clusters talk to which other clusters of addresses may be revealed using the profiling methods of the present invention.

Yet another application may include astronomy surveys using say, galaxy coordinates. Visual inspection quickly discerns clusters; automatic clustering may take very large amounts of storage, which astronomers may be prepared to pay for but the present invention may be able to extract the same information at a much lower cost. This might also impact autonomic space probes where resources are constrained.

In Weather simulations and similar endeavors, a technique called "grid refinement" uses the same idea of progressive refinement by subdividing a region into smaller regions when locally-higher resolution is needed. The manner in which this refinement is used and exploited is however very different from the profiling scenario that the present invention addresses.

Figure 5:
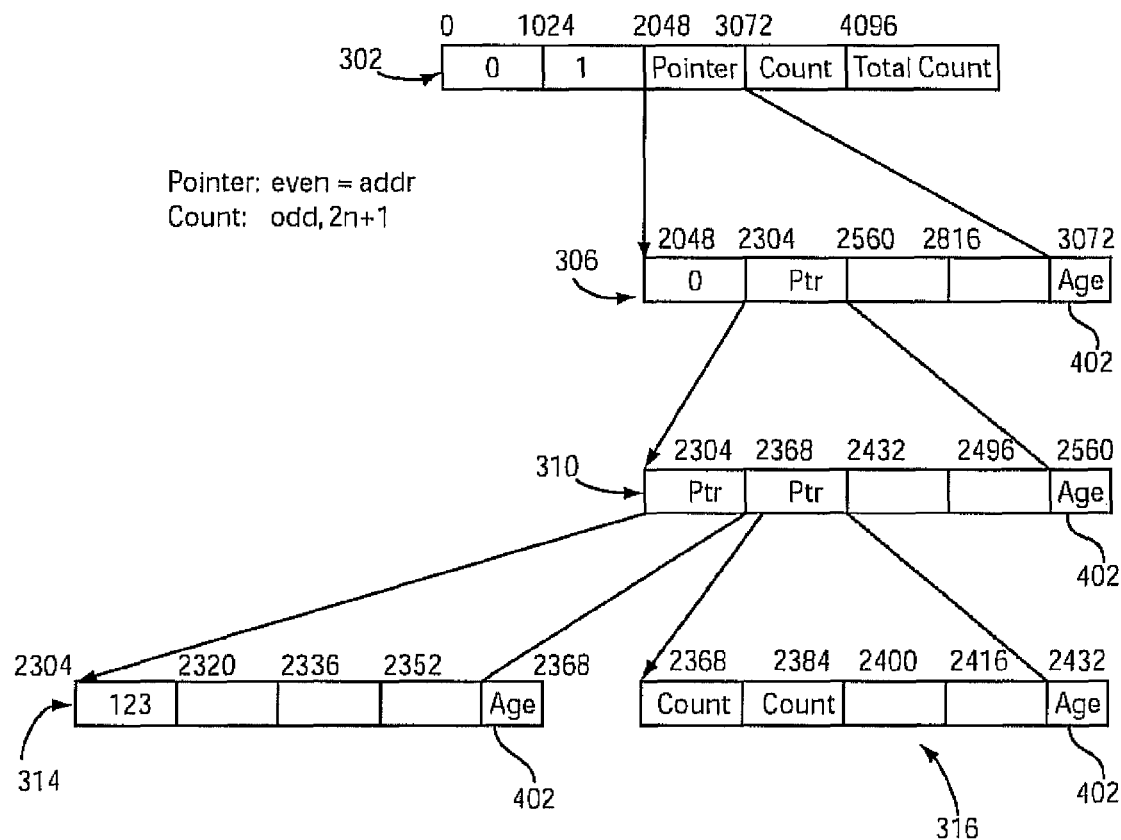
FIG. 5 is a diagram showing an illustrative example applying aging to free up blocks in accordance with the present invention.

Referring to FIG. 5, a diagram shows the illustrative example of FIG. 3 having aging information connected or addended to each block in an aging field 402. The aging information may be employed to designate which blocks are of greater importance or accessed more or less frequently than others. In some instances, some blocks may be desirable to add back to the block pool if the information in the blocks is no longer of value or avoid adding the blocks to the block pool because the block has value.

As aging implies, blocks that have not been used may be of less importance than blocks that have been accessed frequently. An incremented aging field can preserve this information. In one embodiment, a fixed array of blocks may be initially chained or linked in a "free list" with an anchor block. All fields of the blocks may be initially zero. A clock pointer steps linearly through the array of blocks, ignoring tree or list links.

An age field 402 is initially zero for each block. A zero in the age field 402 may signify that the block is a free block. The blocks are linked or chained to each other using pointers. One pointer may be a free-list pointer, and other pointers may be to other implicit free blocks.

Age field 402 is incremented when the block is allocated or traversed, and decremented when reached by a circular clock scan (which designates aging). The freeing of descendant blocks is coordinated when the age field 402 is decremented to zero, e.g., the block is free. Implicit free blocks are converted to proper (e.g., Age field=0, chained) free blocks. This can be performed during the re-allocation of a block. Other aging methods may also be employed.

The aging method may be employed to free up blocks to reduce the amount of available space needed to employ the progressive refinement as described above.

Having described preferred embodiments of a system and method for adaptive program profiling by progressive refinement (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for profiling a sequence of values from a range to determine a frequency of occurrence of a subrange, comprising:
    for a current block, determining whether cells of the current block include a count cell or a pointer cell;
    if the cell includes a pointer cell, following an address that the pointer makes reference to and designating a new block as the current block and repeating the determining step for the new block;
    if the cell includes a count cell, incrementing the count cell;
    comparing the incremented count cell to a threshold with a processor;
    if the count exceeds the threshold, converting the count cell to a pointer cell, which points to a newly allocated block; and
    making the newly allocated block the current block and repeating until count cells do not exceed the threshold or a limit resolution is achieved.

2. The method as recited in claim 1, wherein the current block is determined initially using an address and further comprising initializing a remaining shifted address (RSA) for a given address.

3. The method as recited in claim 2, wherein the current block is determined by extracting bits from a previous RSA and by shifting the remaining bits of the RSA in accordance with a refinement shift (RS).

4. The method as recited in claim 1, wherein the current block includes a count field, and incrementing the count field.

5. The method as recited in claim 1, wherein the threshold is one of static and dynamic, and further comprising adjusting the threshold.

6. The method as recited in claim 5, wherein adjusting the threshold includes balancing between importance of occurrences and available space.

7. The method as recited in claim 5, wherein adjusting the threshold includes balancing between importance of occurrences and resolution.

8. The method as recited in claim 1, further comprising applying aging information to blocks to determine an importance of information stored in the blocks.

9. A computer program product for profiling a sequence of values from a range to determine a frequency of occurrence of a subrange, comprising a non-transitory computer useable medium including a computer readable program, wherein the computer readable program when executed on a computer causes the computer to perform:
    for a current block, determining whether cells of the current block include a count cell or a pointer cell;
    if the cell includes a pointer cell, following an address that the pointer makes reference to and designating a new block as the current block and repeating the determining step for the new block;
    if the cell includes a count cell, incrementing the count cell;
    comparing the incremented count cell to a threshold;
    if the count exceeds the threshold, converting the count cell to a pointer cell, which points to a newly allocated block; and
    making the newly allocated block the current block and repeating until count cells do not exceed the threshold or a limit resolution is achieved.

10. The computer program product as recited in claim 9, wherein the current block is determined initially using an address and further comprising initializing a remaining shifted address (RSA) for a given address.

11. The computer program product as recited in claim 10, wherein the current block is determined by extracting bits from a previous RSA and by shifting the remaining bits of the RSA in accordance with a refinement shift (RS).

12. The computer program product as recited in claim 9, wherein the current block includes a count field, and incrementing the count field.

13. The computer program product as recited in claim 9, wherein the threshold is one of static and dynamic, and further comprising adjusting the threshold.

14. The computer program product as recited in claim 13, wherein adjusting the threshold includes balancing between importance of occurrences and available space.

15. The computer program product as recited in claim 13, wherein adjusting the threshold includes balancing between importance of occurrences and resolution.

16. The computer program product as recited in claim 9, further comprising applying aging information to blocks to determine an importance of information stored in the blocks.

17. A method for profiling a sequence of values from a range to determine a frequency of occurrence of a subrange, comprising:
- defining a sequence of numbers or symbols for which a frequency is to be determined;
- tabulating a frequency of occurrence for the sequence or subsequences thereof in a plurality of bins or cells by:
  - for a current block, determining whether cells of the current block include a count cell or a pointer cell;
  - if the cell includes a pointer cell, following an address that the pointer makes reference to and designating a new block as the current block and repeating the determining step for the new block;
  - if the cell includes a count cell, incrementing the count cell;
  - comparing the incremented count cell to a threshold with a processor;
  - if the count exceeds the threshold, converting the count cell to a pointer cell, which points to a newly allocated block; and
  - making the newly allocated block the current block and repeating until count cells do not exceed the threshold or a limit resolution is achieved.

18. The method as recited in claim 17, wherein the current block is determined initially using an address and further comprising initializing a remaining shifted address (RSA) for a given address.

19. The method as recited in claim 18, wherein the current block is determined by extracting bits from a previous RSA and by shifting the remaining bits of the RSA in accordance with a refinement shift (RS).

20. The method as recited in claim 17, wherein the current block includes a count field, and incrementing the count field.

21. The method as recited in claim 17, wherein the threshold is one of static and dynamic, and further comprising adjusting the threshold.

22. The method as recited in claim 21, wherein adjusting the threshold includes balancing between importance of occurrences and available space.

23. The method as recited in claim 21, wherein adjusting the threshold includes balancing between importance of occurrences and resolution.

24. The method as recited in claim 17, further comprising applying aging information to blocks to determine an importance of information stored in the blocks.

25. A computer program product to determine a frequency of occurrence for a sequence comprising a non-transitory computer useable medium including a computer readable program, wherein the computer readable program when executed on a computer causes the computer to perform the method as recited in claim 17.

* * * * *